United States Patent
Allen et al.

(10) Patent No.: US 9,606,990 B2
(45) Date of Patent: Mar. 28, 2017

(54) COGNITIVE SYSTEM WITH INGESTION OF NATURAL LANGUAGE DOCUMENTS WITH EMBEDDED CODE

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 14/817,345

(22) Filed: Aug. 4, 2015

(65) Prior Publication Data

US 2017/0039188 A1     Feb. 9, 2017

(51) Int. Cl.
 *G06F 17/27* (2006.01)
 *G06F 17/28* (2006.01)
 *G06F 17/24* (2006.01)

(52) U.S. Cl.
 CPC .......... *G06F 17/289* (2013.01); *G06F 17/241* (2013.01); *G06F 17/2705* (2013.01); *G06F 17/275* (2013.01)

(58) Field of Classification Search
 CPC ............... G06F 17/271; G06F 17/2785; G06F 17/30654; G06F 17/5009; G06F 9/4448
 USPC ........................ 704/9; 714/E11.167; 707/758
 See application file for complete search history.

(56) References Cited

U.S. PATENT DOCUMENTS

| | | | |
|---|---|---|---|
| 5,867,399 A * | 2/1999 | Rostoker | G01R 31/31704 714/E11.167 |
| 6,006,221 A | 12/1999 | Liddy et al. | |
| 6,182,062 B1 | 1/2001 | Fujisawa et al. | |
| 7,260,570 B2 | 8/2007 | Brown et al. | |
| 7,672,831 B2 | 3/2010 | Todhunter et al. | |
| 7,680,780 B2 | 3/2010 | Dettinger et al. | |
| 7,831,608 B2 * | 11/2010 | Aizenbud-Reshef | G06F 8/36 707/758 |
| 8,027,832 B2 | 9/2011 | Ramsey et al. | |
| 8,407,042 B2 | 3/2013 | Cancedda | |

(Continued)

OTHER PUBLICATIONS

"Cdecl: C gibberish <---> English", http://cdecl.org/, Retrieved from the Internet on Mar. 23, 2015, 1 page.

(Continued)

*Primary Examiner* — Charlotte M Baker
(74) *Attorney, Agent, or Firm* — Stephen J. Walder, Jr.; Diana R. Gerhardt

(57) ABSTRACT

Mechanisms are provided for processing natural language content having a computer code segment. Natural language content is processed using a natural language processing (NLP) engine and a segment of content within the natural language content is identified that is not recognized by the NLP engine. The segment is analyzed to determine whether the segment contains computer code and, if so, a code segment annotation for the computer code is generated that provides a natural language description of functionality of the computer code in the segment. The code segment annotation is stored in association with the natural language content and natural language processing is performed using the NLP engine on the code segment annotation to further process the natural language content.

20 Claims, 6 Drawing Sheets

(56) References Cited

U.S. PATENT DOCUMENTS

| | | |
|---|---|---|
| 2002/0111792 A1 | 8/2002 | Cherny |
| 2006/0173886 A1 | 8/2006 | Moulinier et al. |
| 2008/0249998 A1 | 10/2008 | Dettinger et al. |
| 2009/0024599 A1 | 1/2009 | Tata |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2015/0309992 A1* | 10/2015 | Visel .................. G06F 17/2785 704/9 |

OTHER PUBLICATIONS

"Detecting programming language from a snippet", http://stackoverflow.com/questions/475033/detecting-programming-language-from-a-snippet, Retrieved from the Internet on Mar. 23, 2015, 5 pages.

"English to Code Converter", Slashdot, http://developers.slashdot.org/story/05/03/25/2113200/english-to-code-converter, Retrieved from the Internet on Mar. 23, 2015, 10 pages.

"Writing Computer Programs Using Ordinary Language: Systems Convert Ordinary Language to Code", All Things Linguistic, http://allthingslinguistic.com/post/56924619586/writing-computer-programs-using-ordinary-language, Retrieved from the Internet on Mar. 27, 2015, 7 pages.

Armstrong, Alex, "MIT—Who Needs Programming Languages?", I Programmer, http://www.i-programmer.info/news/98-languages/6090-mit-who-needs-programming-languages.html, Jul. 12, 2013, 4 pages.

Baccash, Jonathan, "BabelBuster—C to English to C Translator", Carnegie Mellon University, http://www.cs.cmu.edu/~dst/DeCSS/Baccash/, Last Modified Apr. 17, 2001, 1 page.

Bracewell, D.B. et al., "Multilingual single document keyword extraction for information retrieval", Proceedings of 2005 IEEE International Conference on Natural Language Processing and Knowledge Engineering, 2005. IEEE NLP-KE '05, Oct. 30-Nov. 1, 2005, Abstract, 2 pages.

Dumais, Susan T. et al., "Automatic Cross-Language Retrieval Using Latent Semantic Indexing", AAAI Technical Report SS-97-05, Mar. 24-26, 1997, pp. 15-21.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Patch, Kimberly, "Tool turns English to code", The Latest Technology Research News (TRN), http://www.trnmag.com/Stories/2005/032305/Tool_turns_English_to_code_032305.html, Mar. 23-30, 2005, 2 pages.

Reid, Tori, "Rosetta Code "Translates" Code Into Another Programming Language", lifehacker, http://lifehacker.com/rosetta-code-translates-your-code-into-another-progra-1639074496, Sep. 25, 2014, 3 pages.

Whittaker, E. W. D. et al., "CLEF2006 Question Answering Experiments at Tokyo Institute of Technology", Evaluation of Multilingual and Multi-modal Information Retrieval, Lecture Notes in Computer Science vol. 4730, http://link.springer.com/chapter/10.1007/978-3-540-74999-8_42, 2007, 10 pages.

Wolfram, Stephen, "Programming with Natural Language is Actually Going to Work", http://blog.wolfram.com/2010/11/16/programming-with-natural-language-is-actually-going-to-work/, Nov. 16, 2010, 9 pages.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

FIG. 4

430 — Clean and [Pythonic] Way of Reading the Lines of a File Into a List

420 — First and foremost, you should focus on opening your file and reading its contents in an eff and pythonic way. Here is an example of the way I personally DO NOT prefer:

410 — infile = open('my_file.txt', 'r') (# Open the file for reading) — 460 data = infile.read() (# Read the contents of the file) — 462 infile.close() (# Close the file since we're done using it) — 464

422 — Instead, I prefer the below method of opening files for both reading and writing as it is very and does not require an extra step of closing the file once you are done using it. In the stat below, we're [opening the file for reading,] and [assigning it to the variable 'infile.'] Once the within this statement has finished running, the file will be automatically closed. — 450

412 — (# Open the file for reading) — 466 with [open('my_file.txt', 'r')] as [infile] — 450 data = infile.read() (# Read the contents of the file into memory) — 468

424 — 430 — Now we need to focus on bringing this data into a [Python list] because they are iterable, and flexible. in your case, the desired goal is to bring each line of the text file into a separ element. To accomplish this, we will use the splitlines() method as follows:

414 — (# Return a list of the lines, breaking at line boundaries) — 470 my_list = data.splitlines()

COGNITIVE SYSTEM WITH INGESTION OF NATURAL LANGUAGE DOCUMENTS WITH EMBEDDED CODE

BACKGROUND

The present application relates generally to an improved data processing apparatus and method and more specifically to mechanisms for providing a cognitive system with ingestion of natural language documents that have embedded computer code as part of a user viewable portion of the document.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory, is provided for processing natural language content comprising a computer code segment. The method comprises processing, by the data processing system, the natural language content using a natural language processing (NLP) engine. The method further comprises identifying, by the data processing system, a segment of content within the natural language content that is not recognized by the NLP engine. In addition, the method comprises analyzing, by the data processing system, the segment to determine whether the segment contains computer code. Furthermore, the method comprises, in response to determining that the segment contains computer code, generating, by the data processing system, one or more code segment annotations for the computer code. The one or more code segment annotations provide a natural language description of functionality of the computer code in the segment. Moreover, the method comprises storing, by the data processing system, the one or more code segment annotations in association with the natural language content, and performing, by the data processing system, natural language processing, using the NLP engine, on the one or more code segment annotations to further process the natural language content.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an example diagram illustrating an example document with embedded code snippets and the corresponding natural language annotations generated by ECCS ingestion logic in accordance with one illustrative embodiment;

DETAILED DESCRIPTION

Figure 1:
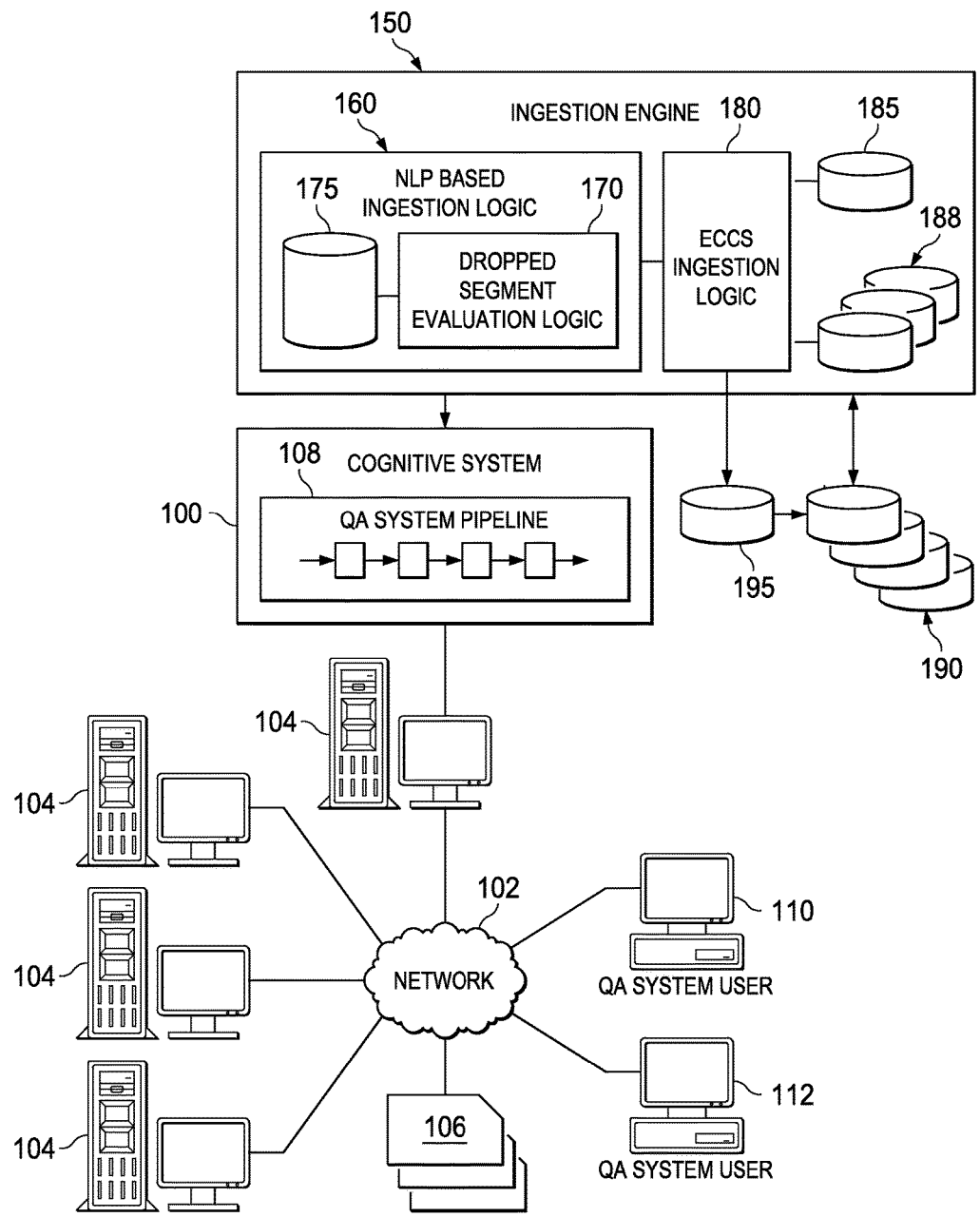
FIG. 1 depicts a schematic diagram of one illustrative embodiment of a cognitive system in which embedded computer code segment (ECCS) ingestion logic is implemented in accordance with one illustrative embodiment.

The illustrative embodiments provide mechanisms for providing a cognitive system with ingestion of natural language documents that have embedded computer code segments expressed as a user viewable portion of the document, i.e. the computer code segments are part of the user viewable aspects of the document and are not metadata or underlying code defining the document structure. The computer code segments are portions of code representing described content of the document itself, i.e. the embedded computer code segments describe, or are exemplary of, concepts which the document content describes. An example may be an electronic text book describing a programming language in which examples of code are present in the document to describe the various programming techniques. Another example may be an electronic document that is a design document that describes a software product and provides examples of some of the coded routines, methods, or the like, that are present in the software product. In other words, a document or passage written in natural language may have, within the segments of natural language, other segments of computer code which have some relation to the natural language segment. Both the natural language and computer code segment are viewable and accessible in the same manner, though they may be delimited differently if there are indicators or formatting changes for each segment.

The problem addressed by the illustrative embodiments is the inability of known natural language processing (NLP) based ingestion mechanisms to recognize embedded computer code, and discern meaning from embedded computer code, in natural language documents. That is, NLP based ingestion mechanisms ingest content with a single parsing and analysis strategy for a single recognizable naturally spoken/written language. As such, any text/tokens in the text of an electronic document will be parsed assuming that they are part of the recognizable naturally spoken/written language. Sections of the content, e.g., electronic documents, that do not fit this assumption are generally dropped and not processed, e.g., images, tables, portions of the documents having computer code embedded therein, or the like. This causes a problem in domains where technical documents are provided as part of a corpus of information, since these technical documents often times contain embedded computer code, e.g., examples of computer code to illustrate or further define a concept described in the document, which provides significant content and context for the technical document. Thus, known NLP based ingestion mechanisms are not able to usefully parse and analyze embedded computer code segments of electronic documents or portions of content, e.g., Slot Grammar (SG) based NLP ingestion mechanisms are not able to operate on such embedded computer code segments.

The illustrative embodiments provide mechanisms that analyze electronic document data structures (hereafter referred to herein as "electronic documents" or simply "documents") and identify embedded computer code based on recognizable terms, phrases, and/or metadata that is indicative of a portion of computer code. The identification is further refined and classified using context clues from surrounding natural language text of the documents which may reference the embedded computer code. Once the portion of the document having embedded computer code, herein referred to as an embedded computer code segment, is properly detected and classified within the natural language text document, additional content is extracted from, or generated based on, the embedded computer code segment. This additional content may comprise information identifying computer code constructs used in the embedded computer code segment, translations of the computer code into pseudo-code, translations of the computer code into natural language descriptions of the computer code, other code narration elements, or the like.

The code narration may take many forms including a concise natural language text narration or summarization of the embedded computer code segment of the document which may be obtained by performing code similarity analysis and analysis of pseudo-code statements and programmer comments in the embedded computer code segment. The code narration may further include artifact or object type interactions for the embedded computer code segment and annotations attached to, or otherwise linked to, the embedded computer code segment to represent language, programming constructs used, outcomes by data types (return types or output), and variables. The code narration may further include correlations to any natural language text portion of the document in a section before or after the embedded computer code segment.

This additional content may be provided as metadata or other linked data that is associated with the original document. The additional content may have a pointer to the embedded computer code segment of the document with which the metadata is associated. Alternatively, the additional content may be embedded in the original document so as to generate a modified document that makes explicit a natural language text representation of the embedded computer code segment that is able to be parsed and able to be properly processed by natural language processing (NLP) mechanisms when performing a cognitive operation. The metadata and/or modified document may be stored as part of a corpus of information which may then be processed by NLP mechanisms of a cognitive system to perform a cognitive operation, such as answering a natural language input question, generating search results, identifying related portions of content, related concepts in multiple documents, or the like.

In one illustrative embodiment, this metadata is provided as annotations to the original document, referred to herein as code segment annotations (CSAs). In one illustrative embodiment, a CSA may comprise at least a natural language description of the computer code, content references that point to or otherwise identify the relevant natural language content within the document that explicitly or implicitly refers to the code segment or elements of the computer code within the code segment, code segment references that point to or otherwise identify the code segment or elements within the code segment that are referenced by other portions of the natural language content of the document, and relationships between the content references and code segment references.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
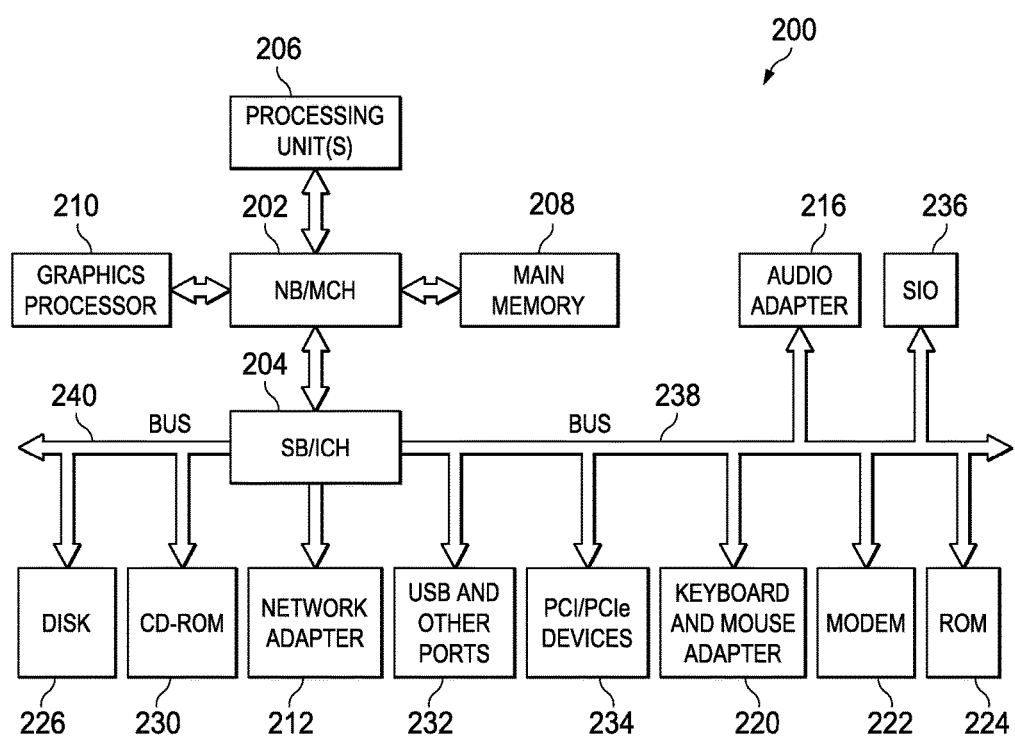
FIG. 2 is a block diagram of an example data processing system in which aspects of the illustrative embodiments are implemented.
Figure 3:
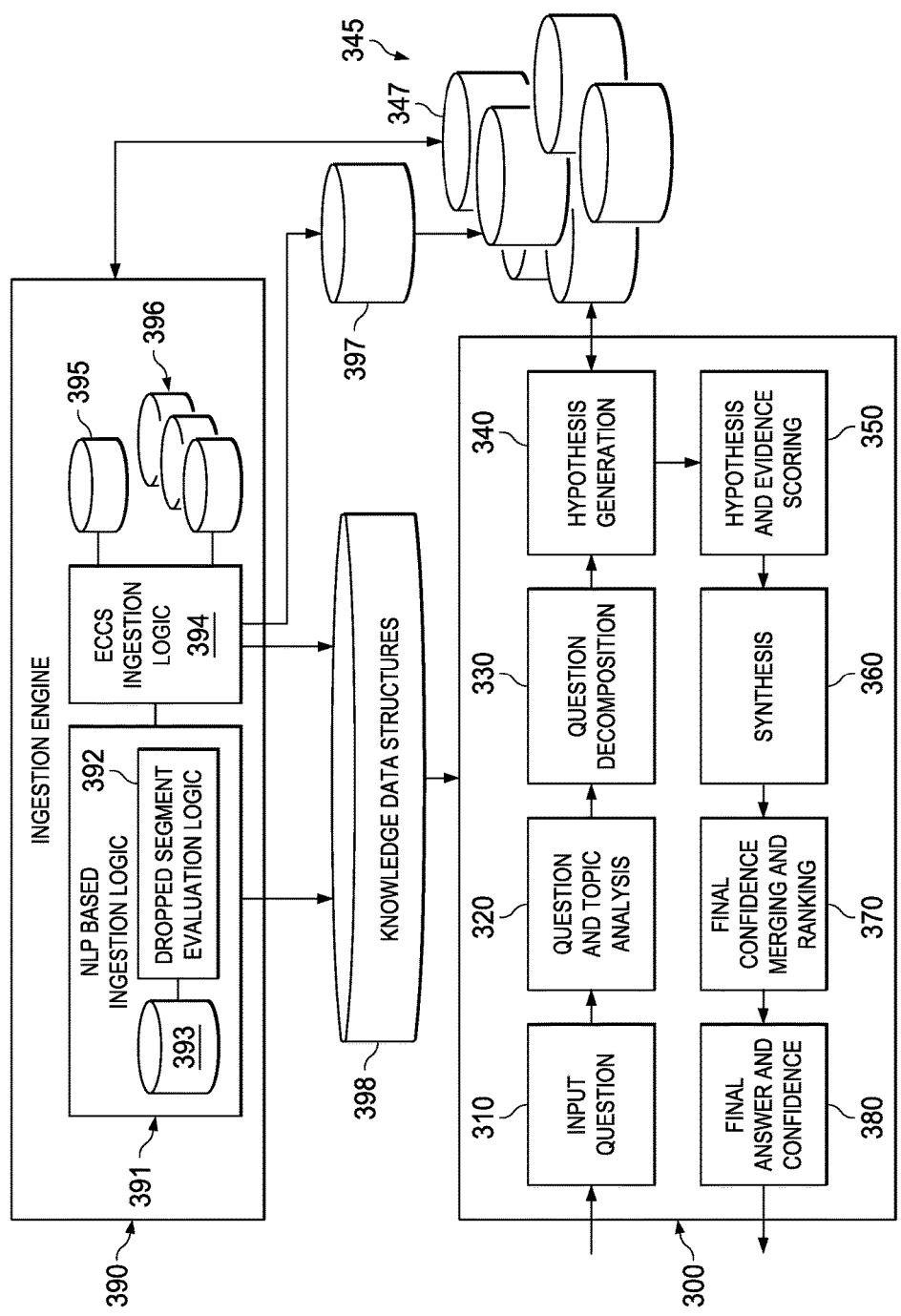
FIG. 3 illustrates a QA system pipeline for processing an input question and which operates in conjunction with ECCS ingestion logic in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these cognitive system and QA pipeline mechanisms of the cognitive system with regard to ingesting natural language documents, represented as document data structures that are part of a corpus of information, where one or more of the natural language documents comprise embedded computer code segments in which the content is user viewable computer code, i.e. computer code that is presented as part of the document for viewing by a reader of the document and is not in the document for actual execution of the computer code. For example, the technical documents may describe the computer code or otherwise present the computer code as an example of the way in which a particular function is performed, such as in the context of describing the operation of an algorithm or application. The computer code in the embedded computer code segment will be referred to hereafter as a "code snippet."

The mechanisms augmenting the operation of the cognitive system and QA pipeline perform analysis of electronic documents or document data structures representing natural language documents to identify portions of the documents that comprise computer code. Having identified the portions of the documents that have computer code and thus, are not generally recognizable by standard NLP mechanisms, the illustrative embodiments identify the type of computer code present, features of the computer code, and translate the computer code into a natural language representation of the computer code that is able to be processed by standard NLP mechanisms when performing a cognitive operation. Thereafter, the translation is stored as metadata linked to, or otherwise embedded in, the original electronic document. As noted above, in some illustrative embodiments, this metadata is stored as annotations to the original electronic document or document data structures, such as in the way of a code segment annotation (CSA) comprising the natural language representation of the computer code, e.g., natural language translation of the computer code, and possibly references to the computer code, references to elements in the computer code, references to portions of the surrounding natural language text that references the computer code or elements of the computer code, and relationships between these references.

The metadata is stored as part of the corpus of information and later used by the cognitive system to represent the portion of computer code in the electronic document when performing the cognitive operation. In some illustrative embodiments, this cognitive operation, as described hereafter, involves answering natural language input questions using a corpus of information which includes the electronic document and corresponding metadata. In other cases, the cognitive operation may comprise performing a natural language text based search of electronic documents or other electronic content and returning ranked results. Of course other cognitive operations may be implemented as well utilizing the mechanisms of the illustrative embodiments to provide metadata that makes explicit a natural language representation of the embedded code segment of the document.

Since example embodiments of cognitive systems used herein to describe illustrative embodiments of the present invention assume a cognitive system that implements a QA system and one or more QA pipelines, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
 Ingest and process vast amounts of structured and unstructured data
 Generate and evaluate hypothesis
 Weigh and evaluate responses that are based only on relevant evidence
 Provide situation-specific advice, insights, and guidance
 Improve knowledge and learn with each iteration and interaction through machine learning processes
 Enable decision making at the point of impact (contextual guidance)
 Scale in proportion to the task
 Extend and magnify human expertise and cognition
 Identify resonating, human-like attributes and traits from natural language
 Deduce various language specific or agnostic attributes from natural language
 High degree of relevant recollection from data points (images, text, voice) (memorization and recall)
 Predict and sense with situational awareness that mimic human cognition based on experiences
 Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to operate in conjunction with, and/or include, logic implemented in specialized hardware, software executed on hardware, or any combination of specialized hardware and software executed on hardware, on the same computing device 104 or a different computing device, for implementing an ingestion engine 150 that comprises NLP based ingestion logic 160 and embedded computer code segment (ECCS) ingestion logic 180. The NLP based ingestion logic 160 performs known NLP based ingestion operations for ingesting portions of content (herein assumed to be "electronic documents" represented as data structures of a corpus) from a corpus of information or content 190, using NLP mechanisms, such as one or more Slot Grammar (SG) based mechanisms for one or more naturally spoken/written languages, e.g., English, French, Spanish, German, Russian, etc. The use of such NLP based ingestion logic 160 is generally known in the art and thus, a more detailed description of such mechanisms will not be provided herein. Any generally known, or later developed, NLP based ingestion logic may be used without departing from the spirit and scope of the illustrative embodiments.

The NLP based ingestion logic 160 is augmented with additional dropped segment evaluation logic 170 that evaluates any portion or segment of a document that is not recognized by the NLP based ingestion logic 160 and thus, is dropped, to determine if that segment contains computer code. That is, as the NLP based ingestion logic 160 performs its operations, there will be segments of the document that the NLP based ingestion logic 160 will not be able to recognize based on its single parsing strategy, e.g., its Slot Grammar (SG) based parsing mechanism. These unrecognizable segments will generally be dropped by the NLP based ingestion logic 160 and essentially ignored. The dropped segment evaluation logic 170 of the illustrative embodiments performs analysis, based on learned embedded code segment detection rules and patterns stored in the rules/patterns data structure 175, to determine whether the dropped segment actually contains embedded computer code or not. If the dropped segment is determined to contain computer code by the dropped portion evaluation logic 170, and thus is a embedded computer code segment, the embedded computer code segment is provided to the ECCS ingestion logic 180 which performs operations in accordance with the illustrative embodiments to ingest the embedded computer code segment and generate metadata describing the computer code.

With regard to ingesting the embedded computer code segment, the ECCS ingestion logic 180, for a candidate embedded computer code segment (candidate ECCS) identified by the dropped segment evaluation logic 170, performs a computer programming language detection operation on the candidate ECCS using key words, key phrases, identified computer language constructs, tags, format rules, etc., such as may be stored in the computer programming language detection data structures 185, to attempt to identify the computer programming language of the candidate ECCS. For example, the candidate ECCS may be broken down into instances of character strings, e.g., words, or sets of characters with delimiters identifying the characters as a single unit, such as spaces, periods, dashes, or any other delimiters. These character strings, or combinations of instances of character strings, e.g., a set of words, may be compared to patterns found in other known computer code segments of particular computer programming languages to identify matches to thereby compute a probability score that the candidate ECCS is written in the corresponding computer programming language, e.g., the phrase "public static void" may be identified in the candidate ECCS and matched to a corresponding pattern of characters in a portion of computer code written in the C# programming language and thus, the probability score that the candidate ECCS is written in the C# programming language is increased.

In some illustrative embodiments, this computer programming language detection operation involves using a naïve language detection algorithm, such as a Bayesian filter that operates on a "bag of words" type approach, to identify corresponding key terms or key phrases (words in the "bag of words") to generate a first set of hypotheses as to the computer programming language of the candidate ECCS. Such Bayesian filters are used often in electronic mail SPAM filtering, but may be modified for operation with the illustrative embodiments to utilize such filters for identifying key terms and phrases in a candidate ECCS and match them to corresponding computer programming languages.

This first set of hypotheses may then be refined by extracting a context area of text surrounding the candidate ECCS, e.g., 1000 characters before and after the candidate ECCS, from the document and discerning clues from the context area as to computer programming language used in the candidate ECCS. For example, key terms or key phrases 185 in the context area that are recognized, through training and machine learning performed on the ECCS ingestion logic 180, as corresponding to a particular type of computer programming language, e.g., HyperText Markup Language (HTML), Java™, JavaScript™, C++, Python, Ruby, Structured Query Language (SQL), and are utilized to generate an evidential scoring for the various hypotheses in the first set of hypotheses. The scoring may be further augmented by analyzing multiple candidate ECCS found in the same document or collection of documents so as to attempt to identify a computer programming language that is common to all of the candidate ECCS. This emphasizes the likelihood that an author will utilize the same computer programming language with multiple computer code examples in the same document or collection of documents, e.g., a document directed to the Ruby programming language, or an application written in the Ruby programming language is more likely to have 7 Ruby computer code snippets than it is to have 3 Ruby, 2 JavaScript, and 2 Python computer code snippets.

Once the ECCS ingestion logic 180 identifies the computer programming language of the candidate ECCS, the ECCS ingestion logic 180 annotates the candidate ECCS in ways that are useful for the cognitive system 100. For example, the ECCS ingestion logic 180 may perform a literal translation of the candidate ECCS into a natural language equivalent of the candidate ECCS. Such literal translation of the candidate ECCS into a natural language equivalent may comprise utilizing programming language translation data structures 188 which store the rules and patterns for mapping computer code constructs in a particular computer programming language to an equivalent natural language representation of the computer code construct. For example, for a computer programming construct having a pattern of the type "infile=open('my_file.txt', 'r')" the natural language equivalent of this computer programming construct may be "open the file for reading and assign it to the variable 'infile'." Such mappings of rules/patterns to computer programming constructs may be specified in the programming language translation data structure 188 for a plurality of different computer programming languages such that multiple data structures 188 may be utilized.

In another example, the text surrounding the ECCS may be parsed and the terms are denoted. The terms are then matched against variable names and object types in the computer code of the ECCS to determine relevance of the terms to the computer code in the ECCS. The sentences and verbs in the surrounding text are then matched to elements of the programming constructs identified in the ECCS and a correlation of the segment of natural language text and a particular line or code segment of the ECCS are associated and linked with an annotation, also referred to herein as a code segment annotation (CSA). The CSA contains references or pointers to elements of the natural language text, elements in the computer code of the ECCS, and the natural language code narration that is generated by an interpretation of the correlated lines or segments in the computer code of ECCS.

Figure 5:
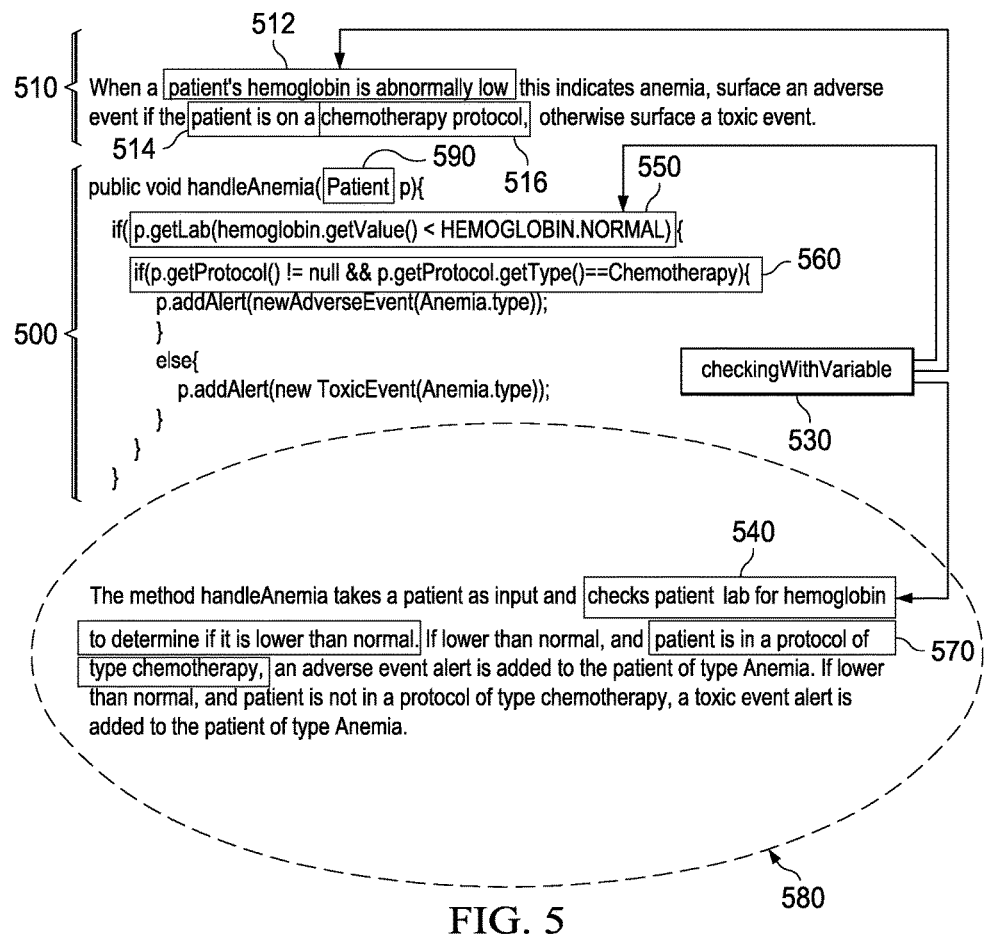
FIG. 5 is another example diagram illustrating a portion of natural language text and an ECCS with corresponding annotation and code narration in accordance with one illustrative embodiment.

For example, in the example shown in FIG. 5, element 510 represents a segment of natural language text associated with an ECCS 500. Element 580 represents a natural language code narration annotation that may be generated using the mechanisms of the illustrative embodiments, based on the correlation between the natural language text segment 510 and the ECCS 500. Element 530 in FIG. 5 represents an annotation entry which includes within this annotation entry 530 the references to the natural language text around the ECCS 500 and, including offsets of where items are within the natural language text and line numbers or other pointers to sections of code snippets in the ECCS 500 (these references are represented in FIG. 5 as arrows pointing from element 530). Elements 512, 514, and 516 are portions of the natural language text that are determined to comprise terms for use in matching against portions of the ECCS 500. Element 590 is a programming construct of an Object and Parameter of type Patient, which matches to the term "patient" exactly in the extracted terms of element 512 and 514, and thus is of high relevance. Elements 550 and 560 are checks with variables which can be mapped to natural language statements of equality and degrees of "lesser than" or "greater than." Element 520 allows greater correlation to the natural language text statement 540 in the code narration 580 such that variables in the ECCS 500 match with the terms specified in the code narration 580, and correct values are extracted and used to generate the code narration 580. As a result, the text and code references provided in the annotation 530 are very close to the code narration 580 enabling the annotation 530 to be very accurate. Along the same lines, 570 narration has a correlation to 560 in the ECCS 500 based on the correlations generated as a result of the portions 514 and 516 of the natural language text segment 510.

In some illustrative embodiments, the annotations generated by the ECCS ingestion logic 180 include annotations that identify the computer programming language type and identifiers of programming language constructs within the candidate ECCS, e.g., a Python ECCS is marked as a Python segment and IF operations are marked as adding an entry to the dictionary data structure or a "dictionary append". This is referred to herein as computer programming language construct labeling annotations. That is, through the process described above, the computer programming language of the candidate ECCS is identified and a corresponding identifier is included in an annotation associated with the candidate ECCS. Moreover, having identified the computer programming language, dictionaries and construct patterns, as may be identified in the programming language translation data structure 188, may be used to identify individual constructs or combinations of constructs and add a corresponding annotation or label that identifies the type of construct in a natural language text annotation. For example, the construct "open( )" may be mapped to the natural language text "open file for reading".

In some illustrative embodiments, through natural language processing of the context area and identification of corresponding portions of the candidate ECCS using the rules/patterns for identifying computer programming constructs in the programming language translation data structure 188, segments in the context area are annotated as linked to corresponding portions of the candidate ECCS. For example, if the context area around the candidate ECCS includes the statement "Then we iterate over the list" and the candidate ECCS includes a portion of the type "for(Object item: list)", then the statement in the context area may be linked to this corresponding portion of the candidate ECCS by way of an annotation that points to these two portions of content in the document. The identification of the corresponding portions of the context area and the candidate ECCS may be identified through associated common terms, phrases, construct analysis, or the like. For example, the construct "for( )" may be identified in the data structure 188 as being equivalent to various terms including "iterate" and the argument "list" corresponds to the term "list" in the context area. Moreover, the location of previously identified portions of the candidate ECCS and relative location of context area text mapped to those previously identified portions may be used to identify an ordering of statements in the context area with regard to the order of constructs in the candidate ECCS and thus, can be used as an additional factor when determining a mapping of a portion of the context area to a construct in the ECCS, e.g., if a previous sentence was mapped to construct 1 in the candidate ECCS, then a subsequent sentence may be more likely to be mapped to a construct 2 that appears after construct 1 in the candidate ECCS.

In still another illustrative embodiment, the annotations may comprise annotating input, outcome, and output by return types or final output of a last set of functions used in the candidate ECCS. For example, through analysis of the candidate ECCS, it can be determined what values are input to the code and generated by the code in the ECCS and what the output of the code will be. This information may be used to annotate the candidate ECCS to specify in natural language text what the output of the code in the candidate ECCS is, e.g., a portion of code in the candidate ECCS that receives an input variable of "First Name, Last Name" and outputs a data file called "biometric_file.dat" may have an annotation generated comprising a natural language statement of the type "The code receives as input a person name and outputs a biometric data file."

In still a further illustrative embodiment, similar terms, nouns, objects, concepts, and the like found in the context area may be correlated with portions of the candidate ECCS and corresponding values specified in the candidate ECCS in association with the portions of the candidate ECCS are identified and correlated with the elements extracted from the context area. For example, assume that a portion of the context area has the statement "The patient's tumor size determines the cancer stage." Further assume that the candidate ECCS has a portion of code that states "if tumor_Size>0.25 and tumor_Size<0.50, stage=stage_II". Through the mechanisms of the illustrative embodiments, in addition to correlating the statement in the context area with the portion of code, the annotation mechanism may generate an annotation that integrates the values specified in the portion of code into a generated natural language statement annotation, e.g., "If Tumor Size is greater than 0.25 and less than 0.50, cancer stage is stage II". An additional annotation may be generated in association with the context area statement of "tumor_Size=Tumor Size" may be generated as well, i.e. on the text "Tumor Size" there is an annotation of the type CodeLinkVariable with the value "tumor_Size" and a pointer to the candidate ECCS from which the value "tumor_ Size" was obtained.

The annotations generated by the ECCS ingestion logic 180 may be compiled and stored in a metadata data structure 195 that is linked or otherwise associated with the original document in which the candidate ECCS was identified. In other illustrative embodiments, the annotations may be embedded in the document itself as additional natural language text that is associated with the candidate ECCS. The annotations may be provided as header information or other metadata information in the document file itself. In cases where the annotations are provided as part of the document, either by way of embedded annotations, header information, or the like, the resulting document 195 is a modified form of the original document by inclusion of the newly generated annotation(s). Any manner of associating the annotations with the candidate ECCS may be utilized without departing from the spirit and scope of the illustrative embodiments.

Preferably, the annotations are provided in such a manner as to permit the cognitive system 100 to process the annotations, along with the original document using natural language processing (NLP) based mechanisms, to facilitate performance of its cognitive operations. Thus, the annotations are provided in a format that is parseable, and able to be analyzed, by the existing parse and analysis techniques utilized by the cognitive system 100. As noted above, in one illustrative embodiment, such processing may comprise ingestion of the document and its annotations for purposes of parsing and analyzing the document/annotations to generate data structures that can be queried and searched by the cognitive system 100 when answering a natural language question posed to the cognitive system 100. For example, a knowledge graph data structure (e.g., linking related concepts found in documents of a corpus 190 to each other based on identified relationships) may be generated based on the original document content and the natural language annotations generated by the ECCS ingestion logic 180. In this way, the existing parsing and analysis logic used by the cognitive system 100 need not be modified due to the fact that the annotations now make explicit the content of the candidate ECCS in a format that is able to be processed by this parsing and analysis logic used by the cognitive system 100.

It should be appreciated that question answering is only one example of a type of cognitive operation and cognitive system 100 that may utilize the mechanisms of the illustrative embodiments. Other examples include medical diagnostic systems, intelligent Internet web page searching and ranking systems, social networking user recommendation systems, e.g., "friend" recommendation systems, various systems that rely upon the identification of related concepts from various sources, and the like. Any system and cognitive operation that is able to utilized the explicit representation of a candidate ECCS as one or more natural language annotations is intended to be within the spirit and scope of the illustrative embodiments.

It should also be appreciated that the various illustrative embodiments described above may be combined such that multiple types of annotations are implemented in a single implementation of the present invention. Thus, in some embodiments, a combination of literal translation, linking of segments, computer programming language construct labeling annotations, and the like, may be utilized without departing from the spirit and scope of the illustrative embodiments.

It should further be appreciated that while the dropped segment evaluation logic 170 and rules/patterns data structure 175 are illustrated in FIG. 1 as being part of the NLP based ingestion logic 160, the illustrative embodiments are not limited to such. Rather the elements 170-175 may be a separate set of logic implemented in the ingestion engine 150, may be part of the ECCS ingestion logic 180, or the like. That is, the configuration of the dropped segment evaluation logic 170 and rules/patterns data structure 175 relative to the NLP based ingestion logic 160 and ECCS ingestion logic 180 may take many different forms depending on the desired implementation so long as the elements 170-175 perform their function of evaluating dropped segments of a natural language document of the corpus 190, that were dropped by the NLP based ingestion logic 160 during NLP based ingestion operations, to thereby identify candidate embedded computer code segments for further processing by the ECCS ingestion logic 180.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE)

or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiments, the QA system pipeline 300 of a cognitive system may operate in conjunction with an ingestion engine 390 that implements dropped segment evaluation logic 392, ECCS ingestion logic 394, and the like, for identifying segments of natural language documents that comprise computer code, such as computer code examples referenced by the document, and generates annotations for making explicit a natural language equivalent of the computer code, or at least portions of the computer code, in the segment. The annotations that are generated by the ECCS ingestion logic 394 may be provided as a separate metadata data structure associated with the original document, as part of the original document to thereby generate a modified document, or the like, as previously discussed above. Moreover, the elements 390-397 are all similar to those already described above with regard to FIG. 1 and corresponding ones of elements 150-195.

Of particular note in FIG. 3, is the fact that the knowledge extracted by ingestion of one or more documents of the corpus or corpora 345, 347, both with regard to NLP ingestion logic 391 and ECCS ingestion logic 394 (e.g., the annotations generated by the ECCS ingestion logic 394 for candidate ECCS in the documents), is compiled into one or more knowledge data structures 398 that are used by the QA system pipeline 300 to perform various ones of the operations set forth in the stages 310-380 of the pipeline 300. For example, the knowledge data structures 398 may comprise, inter alia, a knowledge graph data structure that may be utilized by the hypothesis generation stage 340 logic that applies queries against the corpus/corpora 345, 347 to generate hypotheses or candidate answers to the input question 310. As part of this application of queries, the knowledge graph data structure may be searched to identify entities represented by nodes in the knowledge graph data structure that are related to features extracted from the input question 310 by the question and topic analysis 320 and question decomposition 330 stage logic. The relationships between the natural language statements, the ECCS annotation, and the natural language descriptions can be used to provide feature generation by algorithms that help to score or weight decisions in the QA system pipeline. In one particular embodiment the ECCS ingestion logic, narration, and natural language descriptions can be used to verify the natural language text in the document matches the code snippets or vice versa. This can be used to determine consistency of code segments with natural language statements.

FIG. 4 is an example diagram illustrating an example document with embedded code snippets and the corresponding natural language annotations generated by ECCS ingestion logic in accordance with one illustrative embodiment. As shown in the document 400, the document contains segments 410, 412, and 414 which comprise computer code examples that are referenced by the surrounding content of the document. The other segments 420, 422, and 424 comprise natural language text of the document 400. As mentioned previously, when the NLP mechanisms of the ingestion engine encounter segments 410, 412, and 414, these segments will be "dropped" as they do not conform to the expected pattern of natural language content that is able to be parsed and analyzed by the NLP mechanisms. The other portions 420, 422, and 424 of the document comprise natural language statements conforming to content that the NLP mechanisms are able to process and thus, will be processed in a known manner.

In accordance with the illustrative embodiments, the segments 410-414 that are dropped by the NLP mechanisms are further analyzed by the dropped segment evaluation logic 170, 392 to determine if the dropped segments 410-414 include computer code and thus, are embedded computer code segments (ECCS) in the manner previously described above, e.g., using learned embedded code segment detection rules and patterns stored in the rules/patterns data structure, to determine whether the dropped segments 410-414 actually contains embedded computer code or not. If the dropped segment is determined to contain computer code, as in the depicted example of FIG. 4, and thus is an ECCS, the ECCS is provided to the ECCS ingestion logic 180, 394 which performs operations in accordance with the illustrative embodiments to ingest the embedded computer code segment and generate metadata describing the computer code.

With regard to ingesting the embedded computer code segment, the ECCS ingestion logic 180, 394 for a candidate ECCS identified by the dropped segment evaluation logic 170, performs a computer programming language detection operation on the candidate ECCS using key words, key phrases, identified computer language constructs, tags, format rules, etc., such as may be stored in a computer programming language detection data structure 185, 395 to attempt to identify the computer programming language of the candidate ECCS. As discussed above, this may comprise breaking down instances of character strings within the candidate ECCS and comparing the strings or combinations of strings to known key words, key phrases, constructs, and the like associated with particular computer programming languages. In addition, portions of the context area around the candidate ECCS may be analyzed to determine if there are key words, key phrases, or other indicators of the programming language used in the candidate ECCS. In the depicted example, the segment 420 comprises a reference to the Python programming language in the way of the term "Pythonic" in the title of the document. Moreover, in the segment 424, the term "Python List" is referenced which is another indication that the programming language used in the code snippets of the candidate ECCS 410-414 is likely the Python programming language.

As mentioned previously above, in some illustrative embodiments, this computer programming language detection operation involves using a naïve language detection algorithm, such as a Bayesian filter that operates on a "bag of words" type approach, to identify corresponding key terms or key phrases (words in the "bag of words") to generate a first set of hypotheses as to the computer programming language of the candidate ECCS. This first set of hypotheses may then be refined by extracting the context area of text surrounding the candidate ECCS from the document and discerning clues, such as terms 430, from the context area indicative of the computer programming language used in the candidate ECCS. Also, as noted above, this evaluation may be further augmented by analyzing multiple candidate ECCS 410-414 found in the same document 400 or collection of documents so as to attempt to identify a computer programming language that is common to all of the candidate ECCS 410-414.

Once the ECCS ingestion logic 180, 394 identifies the computer programming language of the candidate ECCS, the ECCS ingestion logic 180, 394 annotates the candidate ECCS in ways that are useful for the cognitive system. In the depicted example, the constructs in the candidate ECCS 410-414 may be compared to known rules/patterns for the identified programming language, e.g., Python in the depicted example, and mapped to corresponding natural language descriptions of those constructs. Moreover, portions of the candidate ECCS may be mapped to keywords and phrases in the context area around the candidate ECCS 410-414 and used to generate a corresponding natural language text annotation. For example, in FIG. 4, the elements 440 in the candidate ECCS 412 and NLP processed section 422 are correlated due to similarity of terms like "open" and "opening", "file" and "my_file.txt", and the like. Similarly, elements 450 may likewise be correlated due to the explicit reference in the NLP processes section 422 to "infile" which is the variable specified in the code snippet of candidate ECCS 412.

Based on the correlations between constructs, key words, key phrases, and the like, in the candidate ECCS 410-412 and the known rules/patterns and context area text, natural language annotations are generated to represent natural language equivalents to the code snippet, or portions of the code snippet. As noted above, these annotations may be associated with the document 400 in many different ways including as separate metadata files or as embedded information in the document 400, headers of the document 400, or other metadata format. In the depicted example, the annotations are inserted into the candidate ECCS 410-412 themselves in association with the code statements with which they correspond as properly delimited comments. Thus, various annotations 460-470 are inserted into the candidate ECCS 410-412 corresponding to the code statements so as to provide a natural language parseable and analyzable natural language equivalent to the computer code.

While FIG. 4 illustrates an example in which the computer code itself comprises the annotations 460-470, it should be appreciated that the illustrative embodiments are not limited to such. Rather, as shown in FIG. 5 discussed previously, the annotations may be constructs that point to elements of the ECCS and elements of the natural language text segments surrounding the ECCS by the way of references. Moreover, the annotations may comprise natural language code narrations, such as shown in FIG. 5, that describe the operation of the ECCS based on correlations between elements of the ECCS and elements of the natural language text segments.

Figure 6:
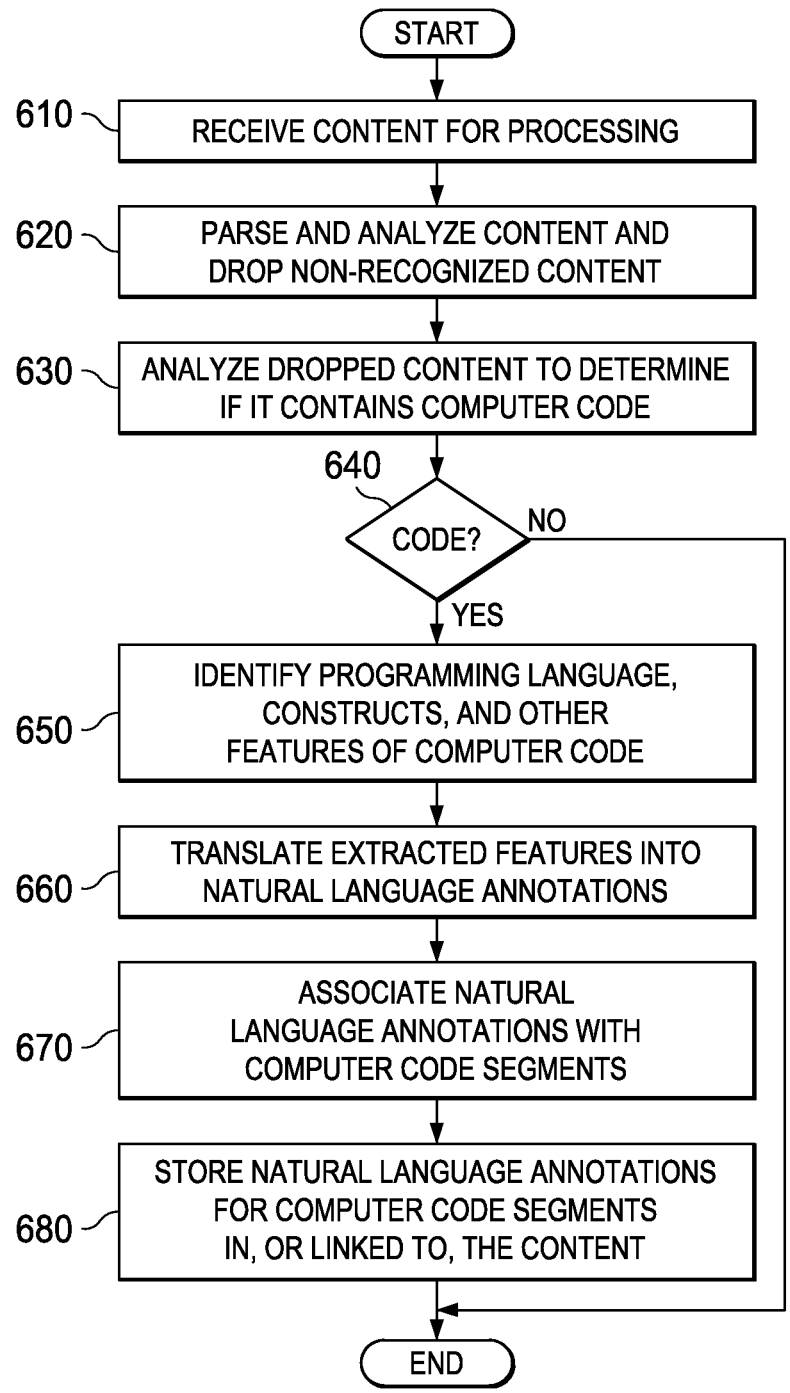
FIG. 6 is a flowchart outlining an example operation for generating natural language annotations in accordance with one illustrative embodiment.

FIG. 6 is a flowchart outlining an example operation for generating natural language annotations in accordance with one illustrative embodiment. The operation shown in FIG. 6 may be implemented, for example, by an ingestion engine, such as ingestion engine 150 or 390, or any other NLP based mechanism which operates on a portion of natural language content that includes a segment of computer code. In one illustrative embodiment, operations outlined in FIG. 6 are implemented by NLP based ingestion logic 160, 391 and ECCS ingestion logic 180, 394 as described previously.

As shown in FIG. 6, the operation starts with receiving content, e.g., an electronic document or other portion of natural language text, for processing (step 610). The content is parsed and analyzed using natural language processing (NLP) mechanisms to extract features of the content, and at least one segment of the content is dropped due to the segment not being parseable or recognizable by the NLP mechanisms (step 620). It should be appreciated that this description assumes that the content has at least one segment that is dropped in this manner. If the content does not have a dropped segment, then the remainder of the operations illustrated in FIG. 6 would not be implemented as there are no dropped segments to be further analyzed.

The at least one dropped segment is analyzed to determine if it contains computer code, e.g., a segment of computer code that is provided as an example in a document to illustrate a point being made within the document (step 630). A determination is made as to whether the at least one dropped segment contains computer code (step 640). If not, then the operation terminates. If the at least one dropped segment contains computer code, then the programming language, constructs, and other features of the computer code are identified (step 650) and these extracted features are translated into natural language annotations using the mechanisms of the illustrative embodiments described previously (step 660).

The natural language annotations are associated with the computer code segments to which they correspond, e.g. by way of embedding them into the computer code segments themselves, adding links between the annotations and the portions of the computer code segments to which they correspond, or any other suitable mechanism for association of the annotation with the portions of the computer code segments to which they correspond (step 670). The natural language annotations are then stored in, or linked to the content (step 680) and the operation terminates.

Thus, the illustrative embodiments provide mechanisms for providing a cognitive system with ingestion of natural language documents that have embedded computer code segments expressed as a user viewable portion of the document, i.e. the computer code segments are part of the user viewable aspects of the document and are not metadata or underlying code defining the document structure. The illustrative embodiments translate the computer code into one or more natural language annotations that are able to be parsed and analyzed by known natural language processing techniques. In this way, the illustrative embodiments transform the computer code segments into natural language equivalents that are able to provide additional information upon which cognitive operations may be performed. As a result, formerly dropped segments of natural language documents or other content are now able to be processed and utilized to generate knowledge for use by cognitive systems.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for processing natural language content comprising a computer code segment, the method comprising:
  processing, by the data processing system, the natural language content using a natural language processing (NLP) engine;
  identifying, by the data processing system, a segment of content within the natural language content that is not recognized by the NLP engine;
  analyzing, by the data processing system, the segment to determine whether the segment contains computer code;
  in response to determining that the segment contains computer code, generating, by the data processing system, one or more code segment annotations for the computer code, wherein the one or more code segment annotations provide a natural language description of functionality of the computer code in the segment;
  storing, by the data processing system, the one or more code segment annotations in association with the natural language content; and
  performing, by the data processing system, natural language processing, using the NLP engine, on the one or more code segment annotations to further process the natural language content.

2. The method of claim 1, wherein generating one or more code segment annotations comprises:
  analyzing a portion of content, within the natural language content, within a defined range of the segment, to identify references in the natural language text in the portion of content to the computer code or to elements within the computer code; and
  generating the natural language description of functionality of the computer code in the segment based on the identified references.

3. The method of claim 1, wherein the one or more code segment annotations further comprise content references that point to relevant portions of the natural language content that explicitly or implicitly refer to the segment or elements of the computer code within the segment, code segment references that point to the segment or elements within the computer code within the segment that are referenced by other portions of the natural language content, and relationships between the content references and code segment references.

4. The method of claim 1, wherein the one or more code segment annotations further comprise an identification of a type of programming language in which the computer code is written and identifiable features within the computer code.

5. The method of claim 1, wherein identifying a segment of content within the natural language content that is not recognized by the NLP engine comprises identifying the segment as a segment that is not recognized by a slot grammar based parsing mechanism implemented by the data processing system.

6. The method of claim 1, wherein analyzing the segment to determine whether the segment contains computer code comprises applying one or more code segment detection rules and patterns, for one or more computer programming languages, to content of the segment to determine if the segment contains computer code.

7. The method of claim 1, wherein generating one or more code segment annotations for the computer code comprises performing a computer programming language detection operation on the computer code of the segment by matching at least one of key word, key phrase, computer language constructs, tags, formatting rules, or code patterns for one or more computer programming languages to elements of the computer code of the segment.

8. The method of claim 1, wherein generating one or more code segment annotations for the computer code comprises:
  performing a first computer programming language detection operation based on a set of recognizable key terms or key phrases for at least one computer programming language to generate a first set of hypotheses, wherein each hypothesis specifies a potential computer programming language used to generate the computer code of the segment;
  calculating, for each hypothesis in the first set of hypotheses, a corresponding evidential score value indicating a likelihood that the computer code of the segment corresponds to a computer programming language of the hypothesis; and
  generating a code segment annotation specifying a determined computer programming language of the computer code of the segment based on the first set of hypotheses and the corresponding evidential score values.

9. The method of claim 8, wherein generating one or more code segment annotations for the computer code comprises:
  performing a second computer programming language detection operation on the first set of hypotheses based on analysis of a window of natural language text appearing either before or after the segment in the natural language content to generate a second set of hypotheses and corresponding evidential scores;
  determining the computer programming language of the computer code of the segment based on the second set of hypotheses; and
  generating a code segment annotation specifying the determined computer programming language of the computer code of the segment.

10. The method of claim 8, wherein generating one or more code segment annotations for the computer code comprises performing a literal translation of the computer code in the segment into the natural language description of the computer code based on predefined rules and patterns for mapping computer code constructs of the determined computer programming language into an equivalent natural language representation.

11. A computer program product comprising a computer readable storage medium having a computer readable program stored therein, wherein the computer readable program, when executed on a computing device, causes the computing device to:
- process the natural language content using a natural language processing (NLP) engine of the computing device;
- identify a segment of content within the natural language content that is not recognized by the NLP engine;
- analyze the segment to determine whether the segment contains computer code;
- in response to determining that the segment contains computer code, generating one or more code segment annotations for the computer code, wherein the one or more code segment annotations provide a natural language description of functionality of the computer code in the segment;
- store the one or more code segment annotations in association with the natural language content; and
- perform natural language processing, using the NLP engine, on the one or more code segment annotations to further process the natural language content.

12. The computer program product of claim 11, wherein generating one or more code segment annotations comprises:
- analyzing a portion of content, within the natural language content, within a defined range of the segment, to identify references in the natural language text in the portion of content to the computer code or to elements within the computer code; and
- generating the natural language description of functionality of the computer code in the segment based on the identified references.

13. The computer program product of claim 11, wherein the one or more code segment annotations further comprise content references that point to relevant portions of the natural language content that explicitly or implicitly refer to the segment or elements of the computer code within the segment, code segment references that point to the segment or elements within the computer code within the segment that are referenced by other portions of the natural language content, and relationships between the content references and code segment references.

14. The computer program product of claim 11, wherein the one or more code segment annotations further comprise an identification of a type of programming language in which the computer code is written and identifiable features within the computer code.

15. The computer program product of claim 11, wherein analyzing the segment to determine whether the segment contains computer code comprises applying one or more code segment detection rules and patterns, for one or more computer programming languages, to content of the segment to determine if the segment contains computer code.

16. The computer program product of claim 11, wherein generating one or more code segment annotations for the computer code comprises performing a computer programming language detection operation on the computer code of the segment by matching at least one of key word, key phrase, computer language constructs, tags, formatting rules, or code patterns for one or more computer programming languages to elements of the computer code of the segment.

17. The computer program product of claim 11, wherein generating one or more code segment annotations for the computer code comprises:
- performing a first computer programming language detection operation based on a set of recognizable key terms or key phrases for at least one computer programming language to generate a first set of hypotheses, wherein each hypothesis specifies a potential computer programming language used to generate the computer code of the segment;
- calculating, for each hypothesis in the first set of hypotheses, a corresponding evidential score value indicating a likelihood that the computer code of the segment corresponds to a computer programming language of the hypothesis; and
- generating a code segment annotation specifying a determined computer programming language of the computer code of the segment based on the first set of hypotheses and the corresponding evidential score values.

18. The computer program product of claim 17, wherein generating one or more code segment annotations for the computer code comprises:
- performing a second computer programming language detection operation on the first set of hypotheses based on analysis of a window of natural language text appearing either before or after the segment in the natural language content to generate a second set of hypotheses and corresponding evidential scores;
- determining the computer programming language of the computer code of the segment based on the second set of hypotheses; and
- generating a code segment annotation specifying the determined computer programming language of the computer code of the segment.

19. The computer program product of claim 18, wherein generating one or more code segment annotations for the computer code comprises performing a literal translation of the computer code in the segment into the natural language description of the computer code based on predefined rules and patterns for mapping computer code constructs of the determined computer programming language into an equivalent natural language representation.

20. An apparatus comprising:
- a processor; and
- a memory coupled to the processor, wherein the memory comprises instructions which, when executed by the processor, cause the processor to:
- process the natural language content using a natural language processing (NLP) engine of the computing device;
- identify a segment of content within the natural language content that is not recognized by the NLP engine;
- analyze the segment to determine whether the segment contains computer code;
- in response to determining that the segment contains computer code, generating one or more code segment annotations for the computer code, wherein the one or more code segment annotations provide a natural language description of functionality of the computer code in the segment;
- store the one or more code segment annotations in association with the natural language content; and
- perform natural language processing, using the NLP engine, on the one or more code segment annotations to further process the natural language content.

* * * * *